United States Patent [19]
Takayasu et al.

[11] Patent Number: 5,665,464
[45] Date of Patent: Sep. 9, 1997

[54] CARBON FIBER-REINFORCED CARBON COMPOSITE MATERIAL AND PROCESS FOR THE PREPARATION THEREOF

[75] Inventors: Jun Takayasu; Kazuyuki Murakami; Eiki Tsushima; Takayuki Izumi, all of Saitama-ken, Japan

[73] Assignee: Tonen Corporation, Japan

[21] Appl. No.: 563,596

[22] Filed: Nov. 28, 1995

[30] Foreign Application Priority Data

Dec. 1, 1994 [JP] Japan .................. 6-323507

[51] Int. Cl.$^6$ .................. C04B 35/52; C04B 35/76; B32B 3/26

[52] U.S. Cl. .................. 428/312.2; 428/304.4; 428/307.3; 501/95.2; 501/99

[58] Field of Search .................. 501/95, 99; 428/304.4, 428/307.3, 312.2

[56] References Cited

U.S. PATENT DOCUMENTS 5,202,293  4/1993  Okamoto et al. .................. 501/95

FOREIGN PATENT DOCUMENTS

A0581696  2/1994  European Pat. Off. .

OTHER PUBLICATIONS

Chemical Abstracts vol. 116, No. 8, 24 Feb. 1992.

Primary Examiner—Richard Weisberger
Attorney, Agent, or Firm—Lorusso & Loud

[57] ABSTRACT

A carbon fiber-reinforced carbon composite material is disclosed which includes a matrix of carbon and unidirectionally oriented carbon fibers dispersed in the matrix, wherein the content of the carbon fibers is at least 50% based on the volume of the composite material, wherein the volume of pores having a pore diameter of 10 µm or more is not greater than 5% of the total pore volume of the composite material, and wherein at least 90% of the total pore volume is the volume of open pores. The composite material is obtained by impregnating carbon fibers with a dispersion having a viscosity of 5–50 cP at 25° C. and containing carbonaceous powder with an average particle diameter of smaller than 0.5 µm in an organic solvent solution of a thermosetting resin. After unidirectionally aligning the carbon fibers, the impregnated fibers are molded and cured and then calcined.

6 Claims, 1 Drawing Sheet

CARBON FIBER-REINFORCED CARBON COMPOSITE MATERIAL AND PROCESS FOR THE PREPARATION THEREOF

BACKGROUND OF THE INVENTION

This invention relates to a unidirectionally oriented carbon fiber-reinforced carbon composite material and to a method of producing same.

Carbon fiber-reinforced carbon composites hereinafter referred to as C/C composites) in which reinforcing carbon fibers are unidirectionally oriented and dispersed within a matrix of carbon have excellent mechanical properties, high resistance to heat, thermal shocks and abrasion and high heat conductivity and, thus, are used in a wide variety of applications, for example, heat sinks, aerospace parts, brakes of aircraft and racing cars and fusion reactor parts.

One known method for the production of such C/C composites is a so-called CVD method in which a premold of carbon fibers having a desired shape is heated in a furnace to a high temperature while feeding a hydrocarbon gas to the furnace, so that the hydrocarbon is thermally cracked to form carbon which deposits on the surface of the fibers of the premold. The CVD method, however, has a problem because it is difficult to uniformly deposit carbon in the depth of the fiber premold so that defects such as cracks and voids are apt to be formed. As a consequence, the resulting C/C composite fails to show satisfactory mechanical strengths in the direction perpendicular to the orientation direction of the fibers. Moreover, the CVD method requires large costs and is time consuming and, thus, is not economically advantageous.

Another method is known for the production of C/C composites, in which a thermosetting resin is used as a precursor for the carbon matrix. Since the carbon yield of the thermosetting resin is as low as about 50%, however, the C/C composites thus obtained contain cracks and voids. To eliminate such cracks and voids, it is necessary to repeat the impregnation and calcination for a number of times, generally 5–10 times. This is of course time consuming (several months are required) and is economically disadvantageous. Further, the mechanical strengths of the resulting composites are not fully satisfactory.

C/C composites may also be produced by a method in which carbon fibers are impregnated with a molten carbonaceous pitch serving as a matrix precursor, the resulting impregnated fibers being subsequently calcined. Since the carbonaceous pitch when melted should exhibit flowability suitable for impregnation, the carbon yield is low. Thus, cracks and voids are unavoidably formed in the C/C composites.

To cope with the foregoing problems, a method is proposed in which a dispersion of raw coke powder in a solution of a thermosetting resin, such as a phenol resin, dissolved in furfural or furfuryl alcohol is impregnated into carbon fibers, the resulting impregnated fibers being subsequently calcined (JP-A-3-247563). The average particle diameter of the coke powder is 30 µm or less, preferably 0.5–15 µm. It is disclosed in JP-A-3-247563 that the use of carbon powder having an excessively small particle size causes a difficulty in obtaining a dense composite material. According to this method, since the coke powder gives a high carbon yield, a C/C composite with an improved quality may be obtained. With this method, however, it is impossible to prepare C/C composites having a dense matrix especially when the fiber content is increased to improve mechanical properties and thermal conductivity.

Thus, it is necessary to repeat the impregnation and calcination in order to improve the mechanical properties. When the impregnation and calcination are repeated, large pores of an open cellular structure can be filled with new layers of the carbon matrix. However, this results in the formation of closed pores. When a C/C composite having closed pores is used under vacuum, such as in a fusion reactor or in space, the gas contained therein expands to cause the formation of cracks or the deterioration of mechanical strengths. Further, the repeated impregnation and calcination will cause a difference in physical properties, such as coefficient of thermal expansion, between the newly formed carbon layers and those of the previously formed matrix, so that a residual internal stress is accumulated in the C/C composite.

Incidentally, in high precision machining, such as precision drilling, which requires a high processing accuracy in the order of micron units, it is essential that the average pore diameter of the material should be as small as possible and should not be greater than the required processing accuracy. The conventional methods cannot produce C/C composites having such a small average pore diameter.

SUMMARY OF THE INVENTION

It is, therefore, an object of the present invention to provide a C/C composite which has a uniform, dense matrix, which exhibits high mechanical strength and thermal conductivity and which permits precision machining, such as drilling, with desired accuracy and dimensional stability.

Another object of the present invention is to provide a simple method which can produce the above-described C/C composites without repeated impregnation steps.

In accomplishing the foregoing objects, there is provided in accordance with the present invention a carbon fiber-reinforced carbon composite material comprising a matrix of carbon, and unidirectionally oriented carbon fibers dispersed in said matrix, wherein the content of said carbon fibers is at least 50% based on the volume of said composite material, wherein the volume of pores having a pore diameter of 10 µm or more is not greater than 5% of the total pore volume of said composite material, and wherein at least 90% of said total pore volume is the volume of open pores having an open cellular structure.

The present invention also provides a method of producing the above composite material, comprising the steps of:

dispersing carbonaceous powder having an average particle diameter of smaller than 0.5 µm in an organic solvent solution containing a thermosetting resin to obtain a suspension having a viscosity of 5–50 cP at 25° C.;

impregnating carbon fibers with said suspension;

unidirectionally aligning said carbon fibers;

molding said unidirectionally aligned fibers impregnated with said dispersion at a temperature sufficient to cure said thermosetting resin; and then calcining said molded product.

In the present specification, the terms "pore volume" and "pore diameter" of C/C composites are intended to refer to those of open pores thereof measured according to the mercury penetration method wherein the mercury pressure is varied between 0 and 60,000 psia.

The total pore volume of a C/C composite may be calculated from the following equation:

$$V_{total}=(V_f\rho_f-V_f\rho_m-\rho+\rho_m)/\rho\cdot\rho_m$$

or $$V_{total} = (\rho - \rho_{c/c})/(\rho \cdot \rho_{c/c})$$

wherein $V_{total}$ represents the total pore volume (cm³/g), $V_f$ represents the content (in terms of % by volume) of the carbon fiber based on the volume of the C/C composite, $\rho_f$ represents the true density (g/cm³) of the carbon fiber calcined by itself at the same temperature as that used in the preparation of the C/C composite, $\rho_m$ represents the true density (g/cm³) of the matrix calcined by itself at the same temperature as that used in the preparation of the C/C composite, $\rho$ represents the bulk density (g/cm³) of the C/C composite, and $\rho_{c/c}$ represents the true density (g/cm³) of the C/C composite.

BRIEF DESCRIPTION OF THE DRAWING

Other objects, features and advantages of the present invention will become apparent from the detailed description of the preferred embodiments of the invention which follows, when considered in light of the accompanying drawing in which.

DETAILED DESCRIPTION OF THE PREFERRED EMBODIMENTS OF THE INVENTION

Figure 1:
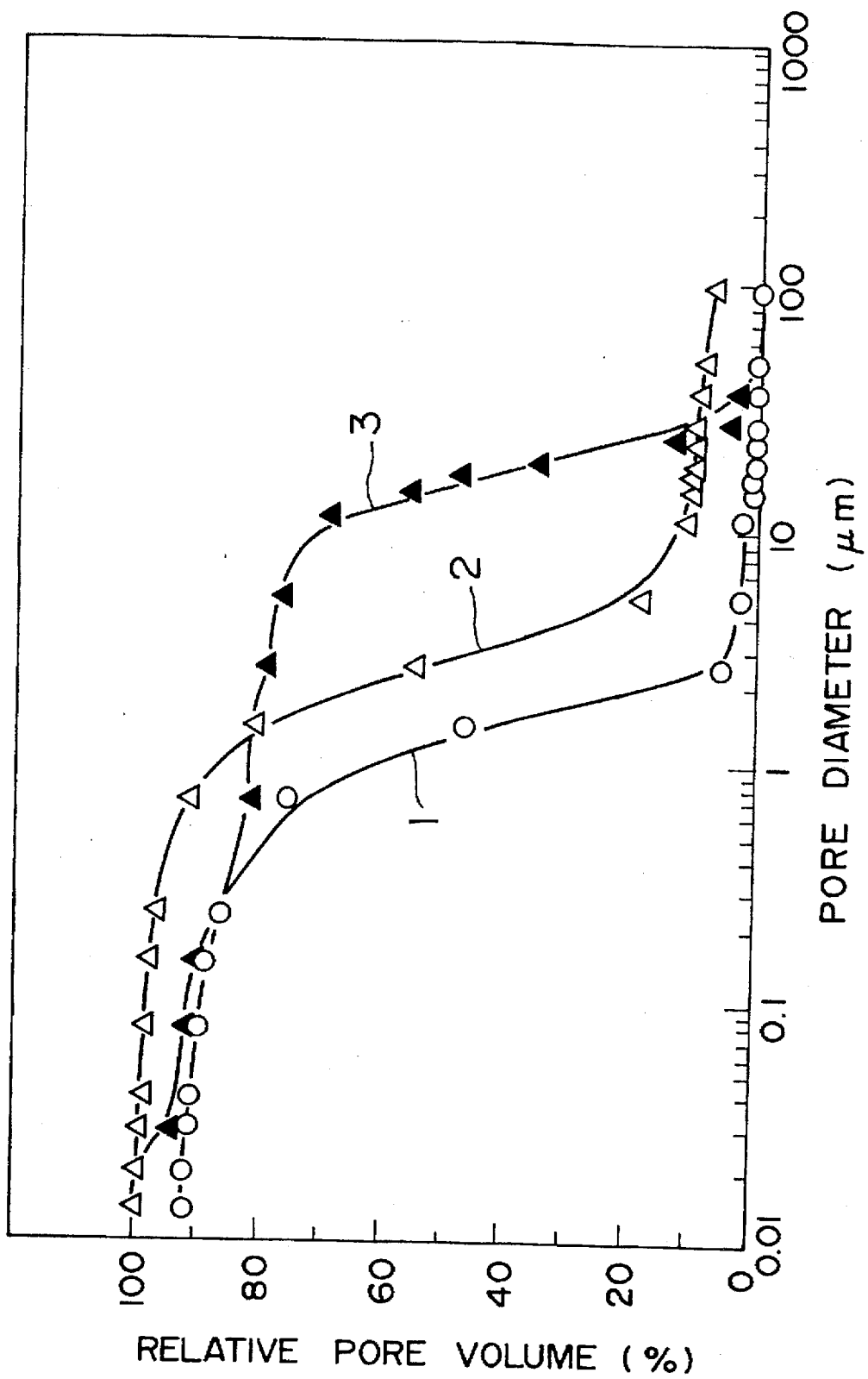
FIG. 1 shows pore volume distribution (relationship between a pore diameter and a volume of pores (in terms of percentage based on the total pore volume) having pore diamters equal to or greater than that pore diameter) of a C/C composite article of the present invention (curve 1) and comparative articles (curves 2 and 3).

The C/C composite according to the present invention includes a matrix of carbon, and unidirectionally oriented carbon fibers dispersed in the matrix.

It is important that the content of the carbon fibers should be at least 50%, preferably 55–85%, based on the volume of the composite material for obtaining satisfactory mechanical strengths and thermal conductivity. It is also important that the volume of pores having a pore diameter of 10 μm or more should be 5% or less, preferably 4.5% or less, of the total pore volume of the composite material, in order to obtain satisfactory precision machinability as well as satisfactory mechanical properties such as tensile strength in the direction normal to the fiber orientation direction. It is further required that open pores having an open cellular structure account for at least 90% of the total pore volume, since otherwise the influence of the closed cells becomes significant.

It is preferred that pores contained in the composite material have an average pore diameter of 2 μm or less and a total pore volume of 0.13 cc/g or less for reasons of precision machinability and mechanical strengths.

The C/C composite material according to the present invention may be prepared as follows.

First, carbonaceous powder having an average particle diameter of smaller than 0.5 μm is dispersed in an organic solvent solution containing a thermosetting resin to obtain a suspension having a viscosity of 5–50 cP at 25° C.

The carbonaceous powder is preferably a carbonaceous material having a C/H atomic ratio of at least 1.8, a softening point of at least 400° C. and a volatile matter content of 20% by weight or less and may be, for example, powder of petroleum-derived pitch, coal-derived pitch, chemical compound-derived pitch, raw coke, calcined coke, carbon black, artificial graphite or natural graphite. It is important that the carbonaceous powder should have an average particle diameter of smaller than 0.5 μm, in order to obtain a C/C composite material having a dense matrix free of cracks and voids and having a high content of the carbon fibers.

The thermosetting resin is preferably a resin affording a high carbon yield such as a phenol resin, a furan resin or a mixture thereof. Phenol resins may be of a resol type obtained by the reaction of a phenol compound with an aldehyde in the presence of an alkali catalyst and of a novolak type obtained by the reaction of a phenol compound with an aldehyde in the presence of an acid catalyst. A novolak resin containing a curing agent such as hexamethylenediamine may be suitably used. The furan resin may be, for example, a phenol-furfural resin or a furfuryl alcohol resin. The furan resin may also be a condensation product obtained in an early stage of the condensation resulting in a furan resin. Such a product may contain unreacted furfuryl alcohol or a mixture of unreacted furfuryl alcohol and unreacted furfural. As the thermosetting resin, there may also be used a liquid phenol resin containing unreacted phenol and unreacted formaldehyde and a mixture of an uncured phenol resin with a furan resin of an early stage of condensation.

The solvent used for dissolving the thermosetting resin is preferably an organic solvent having a boiling point of 130°–250° C., such as furfural or furfuryl alcohol. As described hereinafter, after the suspension of the carbonaceous powder has been impregnated into carbon fibers, the solvent is vaporized with heating. In this case, when a low boiling point solvent is used, bubbles are apt to be formed inside of the carbon fiber bundles during the drying step. Such bubbles cause an expansion of the fiber bundles and obstruct the succeeding steps such as cutting and laminating steps.

Using the above-described carbonaceous powder, thermosetting resin and solvent, a suspension containing the carbonaceous powder dispersed in a solution of the thermosetting resin dissolved in the solvent is prepared by any suitable way such as by using a ball mill or ultrasonic wave. The order of the mixing of the resin, carbonaceous powder and solvent is not critical. If desired, a mixture containing the resin and solvent may be heated to expedite the dissolution of the resin. The thus prepared suspension is then impregnated into carbon fibers.

It is important that the suspension should have a viscosity of 5–50 cP (centipores) at 25° C. The viscosity may be controlled by controlling the relative amounts of the carbonaceous powder, thermosetting resin and solvent. Generally, the contents of the organic solvent and the thermosetting resin in the suspension are 17–240 parts by weight and 1.7–24 parts by weight, respectively, per 10 parts by weight of the carbonaceous powder. Of course the viscosity also depends upon the kinds of the solvent and the resin and the particle size of the carbonaceous powder.

When the viscosity of the suspension is below 5 cP, the suspension is not sufficiently retained within spaces between the carbon fibers. Too high a viscosity above 50 cP is, on the other hand, disadvantageous because the suspension fails to sufficiently penetrate into spaces between the carbon fibers. Thus, when the viscosity is outside the above specific range, large voids are apt to be formed.

Any continuous carbon fibers may be used for the purpose of the present invention. Carbon fibers obtained by calcination at 500° C. or more are preferably used. Illustrative of suitable carbon fibers are PAN-derived carbon fibers, mesophase pitch-derived carbon fibers and isotropic pitch-derived fibers. Graphite fibers calcined at a high temperature may of course be used.

The impregnation may be suitably performed by dipping a bundle or tow of the carbon fibers in the suspension while successively winding the impregnated fibers around a take up drum or frame. To expedite the impregnation, the impregnation process may be performed under a reduced pressure and/or at an elevated temperature. The impregnation is generally carried out at room temperature, however.

The resulting bundles are arranged in parallel with each other to form a sheet in which the carbon fibers are unidirectionally oriented. The sheet is then dried with heating at a temperature below the curing temperature, generally at 50°–100° C. To expedite the drying, the heating may be performed under a reduced pressure.

The dried sheets are placed in a mold cavity such that the fibers are oriented in one direction and is molded into a desired shape at a temperature higher than the curing temperature of the thermosetting resin. The solvent remaining after the drying step is removed in an early stage of the molding step by evacuating the mold cavity at a temperature of about 60°–90° C. The molding is generally carried out at a pressure of 5–25 MPa, preferably 10–20 MPa, and a temperature of 80°–200° C. in the case where a phenol resin is used as the thermosetting resin, 70°–160° C. in the case of a furan resin and 70°–200° C. in the case of a mixture thereof. The temperature is preferably continuously or step-wise increased during molding stage which is generally continued for 10 minutes to 10 hours or more.

The resulting cured body is then calcined and, if desired, graphitized at a temperature of generally above 1,000° C., preferably above 2,000° C. in an inert gas atmosphere under atmospheric pressure or under a pressurized condition.

In the present invention, C/C composites having a high density of 1.6 or more can be obtained even with a single series of the steps of impregnation, molding and calcination (and graphitization, if desired). Because of the specific viscosity of the suspension and small particle size of the carbonaceous powder, vapors can effectively escape from the matrix so that large voids are not formed and pores if any are uniformly dispersed open pores with small pore diameters. This permits an increase of the content of the carbon fibers in the C/C composites.

The following examples will further illustrate the present invention. Parts are by weight.

EXAMPLE 1

Coke-powder (65 parts) having an average particle diameter of 0.45 μm, a softening point of 550° C. and a volatile matter content of 0.5% by weight was dispersed in a solution obtained by dissolving 35 parts of a resol-type phenol resin in 325 parts of furfuryl alcohol to obtain a suspension having a viscosity of 13 cP at 25° C. Strands of carbon fibers were then impregnated with the suspension. The impregnated strands were wound around a drum to form a prepreg sheet having unidirectionally aligned carbon fibers. The prepreg sheet was then dried in vacuum oven at 65° C. and cut into a predetermined size. The cut sheets were stacked and pressed at 150° C. and 20 MPa for one hour and post-cured at 170° C. for another one hour to obtain a cured composite in the form of a rod having dimensions of 25–30 mm thickness, 30 mm width and 100 mm length. The composite was carbonized at 1,200° C. in a nitrogen flow at atmospheric pressure and then graphitized at 2,500° C. in an argon flow at atmospheric pressure to obtain a C/C composite article. The heating rate was 1° C./minute in the carbonization treatment and 10° C./minute in the graphitization treatment.

The total pore volume $V_{total}$, the carbon fiber content $V_f$, the volume of pores $V_{10+}$ having a pore diameter of 10 μm or more, the volume of pores $V_{open}$ having an open cellular structure, the volume of pores $V_{1+}$ having a pore diameter of 1 μm or more and the average pore diameter $D_{av}$ of the C/C composite article are as shown in Table 1, while the pore volume distribution of the C/C composite article is shown in FIG. 1 (curve 1). As will be understood from FIG. 1, most of the pores of the C/C composite article have a pore diameter of about 1 μm. The C/C composite article was found to be machined by precision drilling with good machinability and dimensional stability.

EXAMPLE 2

Example 1 was repeated in the same manner as described except that the suspension consisted of 63 parts of the coke powder, 37 parts of the phenol resin and 524 parts of the furfuryl alcohol and had a viscosity of 22 cP at 25° C. The thus obtained C/C composite article had the pore characteristics shown in Table 1 and showed good machinability and dimensional stability.

Comparative Example 1

Example 1 was repeated in the same manner as described except that coke powder having an average particle diameter of 0.8 μm was used in lieu of the 0.45 μm average particle diameter coke and that the suspension consisted of 77 parts of the coke powder, 23 parts of the phenol resin and 306 parts of the furfuryl alcohol and had a viscosity of 18 cP at 25° C. The thus obtained C/C composite article had the pore characteristics shown in Table 1 and showed no good machinability.

Comparative Example 2

Example 1 was repeated in the same manner as described except that coke powder having an average particle diameter of 0.8 μm was used in lieu of the 0.45 μm average particle diameter coke and that the suspension consisted of 65 parts of the coke powder, 35 parts of the phenol resin and 616 parts of the furfuryl alcohol and had a viscosity of 18 cP at 25° C. The thus obtained C/C composite article had the pore characteristics shown in Table 1 and showed no good machinability. The pore volume distribution of the C/C composite article is shown in FIG. 1 (curve 2). As will be understood from FIG. 1, while most of the pores of the C/C composite article have a pore diameter of about 1.1 μm, large pores having a pore diameter of 10 μm or more are present. In FIG. 1, the pore characteristics of a commercially available C/C composite article (CX-2002U manufactured by Toyo Carbon Co., Ltd.) are also shown (curve 3). The average pore diameter $D_{av}$ of this C/C composite article was 15.6 μm.

Comparative Example 3

Example 1 was repeated in the same manner as described except that coke powder having an average particle diameter of 0.47 μm was used in lieu of the 0.45 μm average particle diameter coke and that the suspension consisted of 65 parts of the coke powder, 35 parts of the phenol resin and 231 parts of the furfuryl alcohol and had a viscosity of 130 cP at 25° C. The thus obtained C/C composite article had the pore characteristics shown in Table 1 and showed no good machinability.

Comparative Example 4 comparative Example 1 was repeated in the same manner as described except that after the calcination, the calcined product was again impregnated with the suspension. The thus obtained C/C composite article had the pore characteristics shown in Table 1 and showed no good machinability.

TABLE 1

|  | Example No. | | Comp. Ex. No. | | | |
| --- | --- | --- | --- | --- | --- | --- |
|  | 1 | 2 | 1 | 2 | 3 | 4 |
| $V_{total}$ (cc/g) *1 | 0.094 | 0.101 | 0.112 | 0.134 | 0.109 | 0.069 |
| $V_f$ (%) *2 | 71 | 65 | 51 | 61 | 48 | 61 |
| $V_{10+}$ (%) *3 | 1.6 | 4.4 | 7.2 | 10.6 | 2.3 | 4.0 |
| $V_{open}$ (%) *4 | 100 | 100 | 95 | 97 | 100 | 50 |
| $V_{1+}$ (%) *5 | 60 | 65 | 76 | 87 | 83 | 71 |
| $D_{av}$ (μm) *6 | 1.21 | 1.48 | 1.73 | 2.22 | 3.46 | 1.80 |

*1: total pore volume
*2: content (%) of the carbon fibers based on the volume of the C/C composite
*3: volume (%) of pores having a pore diameter of 10 μm or more based on the total pore volume
*4: volume (%) of pores having an open cellular structure based on the total pore volume
*5: volume (%) of pores having a pore diameter of 1 μm or more based on the total pore volume
*6: average pore diameter of the C/C composite article The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A carbon fiber-reinforced carbon composite material comprising a matrix of carbon, and unidirectionally oriented carbon fibers dispersed in said matrix, wherein the content of said carbon fibers is at least 50% based on the volume of said composite material, wherein the volume of pores having a pore diameter of 10 μm or more is not greater than 5% of the total pore volume of said composite material, and wherein at least 90% of said total pore volume is the volume of open pores having an open cellular structure.

2. A composite material as set forth in claim 1, wherein the content of said carbon fibers is 55–85% based on the volume of said composite material.

3. A composite material as set forth in claim 1, wherein the volume of pores having a pore diameter of 10 μm or more is not greater than 4.5% of said total pore volume.

4. A composite material as set forth in claim 1, wherein said open pores account for at least 95% of said total pore volume.

5. A composite material as set forth in claim 1, wherein said total pore volume is 0.13 cc/g or less.

6. A composite material as set forth in claim 1, and having an average pore diameter of not greater than 2 μm.

* * * * *